US012035000B1

United States Patent
Liu et al.

(10) Patent No.: US 12,035,000 B1
(45) Date of Patent: Jul. 9, 2024

(54) SELECTIVELY REVEALING GARMENT, AND SYSTEM AND CONTROL METHOD THEREOF

(71) Applicant: HYTTO PTE. LTD, Singapore (SG)

(72) Inventors: Dan Liu, Guangdong (CN); Jilin Qiu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/140,262

(22) Filed: Apr. 27, 2023

(51) Int. Cl.
| | |
|---|---|
| H04N 21/431 | (2011.01) |
| A41F 1/00 | (2006.01) |
| G06T 11/00 | (2006.01) |
| H04N 21/2187 | (2011.01) |
| H04N 21/4223 | (2011.01) |
| H04N 21/442 | (2011.01) |
| H04N 21/478 | (2011.01) |

(52) U.S. Cl.
CPC ......... *H04N 21/4318* (2013.01); *A41F 1/002* (2013.01); *G06T 11/00* (2013.01); *H04N 21/2187* (2013.01); *H04N 21/4223* (2013.01); *H04N 21/4312* (2013.01); *H04N 21/44218* (2013.01); *H04N 21/478* (2013.01); *G06T 2210/62* (2013.01)

(58) Field of Classification Search
CPC ........... H04N 21/4318; H04N 21/2187; H04N 21/4223; H04N 21/4312; H04N 21/44218; H04N 21/478; A41F 1/002; G06T 11/00; G06T 2210/62
See application file for complete search history.

(56) References Cited

U.S. PATENT DOCUMENTS

| | | | | |
|---|---|---|---|---|
| 9,762,515 | B1* | 9/2017 | Olivares | G06Q 20/18 |
| 11,134,041 | B1* | 9/2021 | He | G06Q 20/065 |
| 2008/0189625 | A1* | 8/2008 | Zuta | H04N 21/4318 |
| | | | | 715/753 |
| 2012/0105457 | A1* | 5/2012 | Shuster | A63F 13/50 |
| | | | | 345/473 |
| 2013/0212840 | A1* | 8/2013 | Ahmadshahi | A41C 3/00 |
| | | | | 24/303 |
| 2016/0363806 | A1* | 12/2016 | Sinderbrand | A45C 3/06 |
| 2019/0110538 | A1* | 4/2019 | Ghasletwala | A41D 27/285 |
| 2019/0325279 | A1* | 10/2019 | Wang | G06T 7/13 |
| 2020/0223071 | A1* | 7/2020 | Mahoney | A63B 21/00181 |
| 2020/0314464 | A1* | 10/2020 | Liu | H04N 21/23418 |
| 2021/0390215 | A1* | 12/2021 | Sangle-Ferriere | G06V 20/56 |
| 2022/0286716 | A1* | 9/2022 | Zhou | H04N 21/23424 |

FOREIGN PATENT DOCUMENTS

| | | | |
|---|---|---|---|
| CN | 207744722 U | * | 8/2018 |
| CN | 207744722 U | | 8/2018 |

OTHER PUBLICATIONS

CN-207744722-U (Machine Translation on Oct. 25, 2023) (Year: 2018).*

* cited by examiner

*Primary Examiner* — Michael Le
(74) *Attorney, Agent, or Firm* — Holtz, Holtz & Volek PC

(57) ABSTRACT

A selectively revealing garment includes an exposure module and a controller which controls the exposure module to selectively reveal portions of a user's anatomy in response to a received control signal, by control of one or more polymer-dispersed liquid crystal (PDLC) films provided in the garment, or by control of fastening systems integrated into the garment.

17 Claims, 17 Drawing Sheets

SELECTIVELY REVEALING GARMENT, AND SYSTEM AND CONTROL METHOD THEREOF

BACKGROUND

1. Field

The present invention relates to a selectively revealing garment, and a system and method using the same.

The practice of exhibitionism for the purpose of sexual gratification, amusement, and/or "shock value" to bystanders is known. This type of exhibitionism is often referred to as "outdoor exposure," and generally refers to a situation wherein a participant exposes/reveals intimate areas (e.g., breasts, genitals, buttocks, etc.), in a public or semi-public context. As used herein, the term "outdoor exposure" is not intended to be limited only to exhibitionist activities undertaken outdoors in real space, but also includes same or similar activities undertaken in virtual spaces (e.g., an online video chat session).

The practice of exhibitionism can be performed either by a single participant, or by several participants. For example, one participant may be instructed to expose/reveal certain body parts and/or undress to various degrees by another participant (e.g., as in S/M play). In addition, a model hosting an online video chat may receive "tips" of virtual and/or real currency from viewers, and can expose certain body parts and/or undress to various degrees based on an amount of tips received.

In the above-described types of exhibitionism, actual exposure (and/or the potential for exposure) to friends, acquaintances, and/or strangers (observers) may provide sexual gratification to the participant and/or the observers.

Typically, in "outdoor exposure" activities, it is necessary for a participant who undresses to manually remove clothing to achieve exposure. However, in a situation in which the participant has removed a substantial amount of clothing, it may be difficult to return to a clothed state quickly in the event that an emergency situation arises.

Further, in an online video chat context, there could arise a situation whereby the model hosting the chat receives a certain amount of "tips" from a viewer or viewers to satisfy a reward condition (e.g., removing a piece of clothing and/or revealing/exposing one or more intimate areas). It would be convenient to provide a way for the model to perform exposure without having to physically remove their clothing, and/or to provide the opportunity for viewers to control the level of exposure of the model's body directly and/or indirectly.

The above-described "outdoor exposure" activities can also be combined with wearable and/or insertable adult toys to superimpose different types of sexual stimulation and thereby produce a more intense or pleasurable experience.

2. Related Art

CN207744722U provides an example of a garment which includes the ability to switch between transparent and opaque states. In particular, the garment of CN207744722U includes a film of a type which is typically opaque, but becomes transparent when a voltage is applied thereto.

U.S. Pat. No. 9,762,515 describes a system which enables one or more viewers to "tip" a model during an online video chat session hosted by the model, wherein the host can define tipping parameters for performing predefined acts, with use of an adult toy, based on the amount of tips received. The adult toy can be wirelessly enabled (e.g., by Wi-Fi or Bluetooth™) to receive commands directly from a server via a web browser extension, or from a website hosting an online video chat session. The adult toy may also be configured to connect to an application installed on a device operated by the host, wherein the application communicates with the web browser extension to relay commands to the adult toy. The browser extension or website may also be able to generate live control links to enable certain users to have live control of the host's adult toy.

SUMMARY

It is an object of the present invention to provide a garment which is selectively revealing of a wearer's body, under control of the wearer and/or at least one third party ("viewer"), and a system and control method using the same, to facilitate the practice of exhibitionism in various forms for the purpose of sexual gratification for the wearer and/or the viewer(s), in both real and virtual spaces.

BRIEF DESCRIPTION OF THE DRAWINGS

FIGS. 11A and 11B illustrate exemplary session screens according to an embodiment;

DETAILED DESCRIPTION

Figure 1:
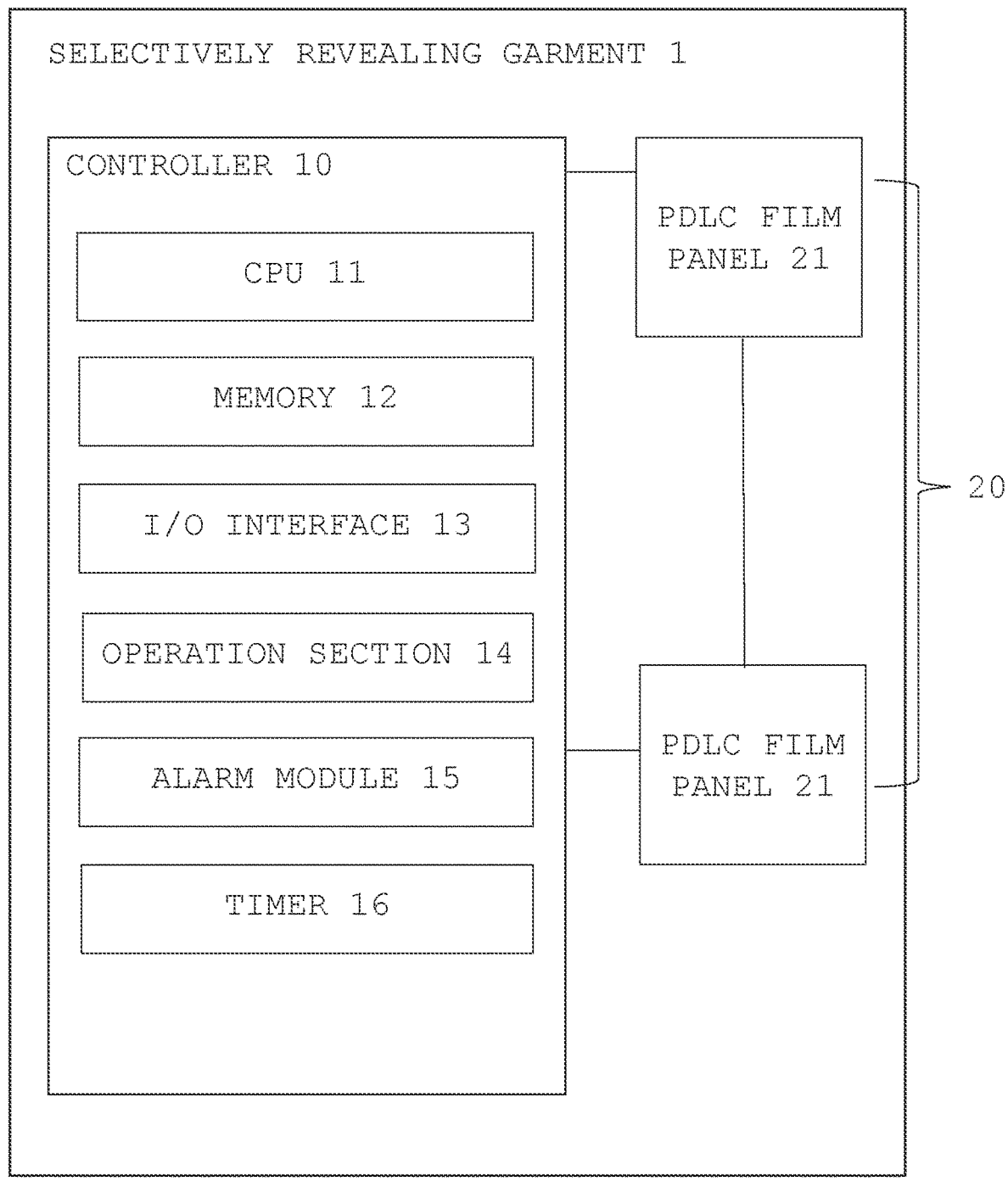
FIG. 1 is a block diagram schematically illustrating a hardware configuration of a selectively revealing garment according to an embodiment.

Hereinafter, embodiments of the present invention are described with reference to the drawings in which the same reference numerals are given to same or corresponding portions.

FIG. 1 is a block diagram schematically illustrating an exemplary configuration of a selectively revealing garment 1 according to an embodiment.

As shown in FIG. 1, the garment 1 includes a controller 10, and an exposure module 20 which is configured to enable portions of a body of a user wearing the garment 1 to be selectively exposed under control of the controller 10.

According to an embodiment, the exposure module 20 is configured by forming at least a portion of the garment 1 of a polymer-dispersed liquid crystal (PDLC) film. As is known to those of ordinary skill in the art, a PDLC film is a film which is typically opaque but becomes transparent when a voltage is applied thereto. In particular, the PDLC film is configured to be variably transparent along a range from an opaque state (normal state) to a substantially fully transparent state, based on an amount of voltage applied. In this way, the portion(s) of the garment 1 formed of the PDLC film can selectively be made transparent (see-through) to various degrees, to expose portions of the wearer's anatomy thereunder.

As shown schematically in FIG. 1, and as described in further detail below, according to an embodiment, the exposure module 20 comprises one or more PDLC film panels 21, and the controller 10 controls the PDLC film panel(s) 21 in response to received control instructions. A power source (not shown) supplies power to the components of the garment 1.

Further, as shown schematically in FIG. 1, the controller 10 includes a hardware processor (CPU) 11 which operates under control of a program stored in a memory 12 to control operation of the garment 1, and further includes an input/output (I/O) interface 13 by which the controller 10 of the garment 1 can communicate with another device. The I/O interface 13 may be configured as a wired interface, or may be configured to send and receive signals by wireless communication, such that components of the garment 1 are controllable by signals received from an external device and processed by the controller 10. For example, the garment 1 may be configured to wirelessly communicate by various wireless systems including, but not limited to, Wi-Fi, Bluetooth™, ZigBee, NFC, and IrDA. The specific wireless system is not intended to be limited, and may be any suitable short or long-distance wireless system allowing the garment 1 to receive control signals from an external device.

While the controller 10 in FIG. 1 comprises a CPU 11 operating under control of a program stored in the memory 12, one of ordinary skill will appreciate that the controller 10 may be configured as a standalone processing circuit.

As shown in FIG. 1, the controller 10 may further include an operation section 14, an alarm module 15, and a timer 16. The alarm module 15 may be configured as a buzzer configured to make a sound, a signal lamp configured to output a light signal, a vibrator configured to vibrate, and the like. These examples are not intended to be limiting, and the alarm module 15 may be configured by any appropriate device capable of outputting an alarm and/or a notification signal to a user.

It is noted that while FIG. 1 illustrates the operation section 14, alarm module 15, and timer 16 as being integrated within the controller 10, one of ordinary skill in the art will appreciate that these elements may be separately provided from the controller 10 and operably coupled thereto.

In an embodiment, the exposure module 20 comprises a plurality of PDLC film panels 21 provided in specific areas of the garment 1 which are to be exposed by a user while wearing the garment 1 (e.g., intimate areas), and a remainder of the garment 1 is formed of a typical opaque or semi-opaque cloth or fabric. Alternately, an entirety of the garment 1 can be formed of a single PDLC film panel 21, or of a plurality of PDLC film panels 21 connected/spliced together. The specific arrangement of the PDLC film panel(s) 21 is not intended to be limited, as long as each PDLC film panel 21 can be individually controlled.

Figure 2:
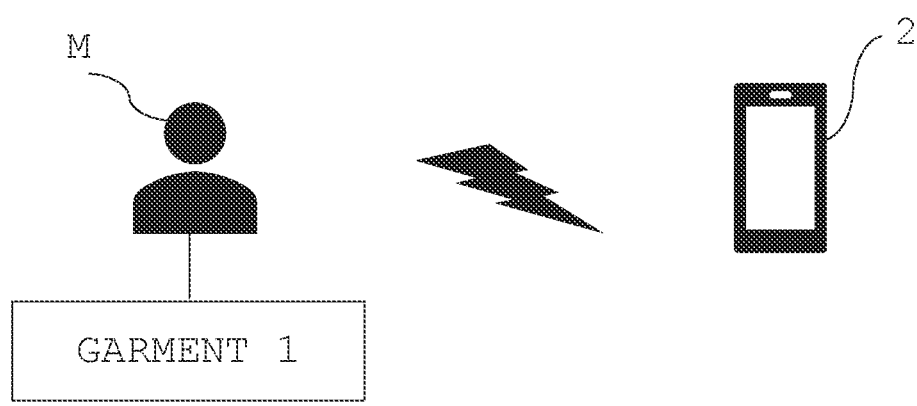
FIG. 2 is a block diagram illustrating an overall configuration of a system according to an embodiment.

FIG. 2 is a block diagram illustrating an exemplary configuration of a system 100 according to an embodiment. As shown in FIG. 2, the system 100 includes the garment 1 (to be worn by a model M) and a terminal device 2. The garment 1 is configured to, under control of the controller 10, receive control instructions from the terminal device 2 via the I/O interface 13, and to perform control of the garment 1 according to the received control instructions. In particular, each of the at least one PDLC film panel 21 of the garment 1 may be individually controllable by the controller 10 under control of the received control instructions.

As shown in FIG. 2, the terminal device 2 may be configured as a mobile terminal, such as a smartphone, smart watch, tablet, or the like. However, the terminal device 2 is not intended to be limited only to these examples, and may be any device capable of communicating with the controller 10 of the garment 1 via the I/O interface 13 so as to issue instructions thereto.

The timer 16 realizes a timer function whereby a countdown timer can be set by a user and/or a third party. The timer function may act in response to a received instruction to initiate a countdown at the end of which the PDLC film panels 21 are made transparent to achieve exposure. The controller 10 may also be provided with a stop or pause function for stopping or pausing the countdown in the event that an emergency situation arises while the countdown is occurring. This safety function may provide a level of comfort to users who may be interested in attempting outdoor exposure, but are not yet experienced with it. The countdown timer and stop or pause functions may be initiated by way of the terminal device 2. In this way, the timing and duration of exposure by control of the exposure module 20 of the garment 1 can be fully controlled by the wearer and/or a third party.

As described above, the garment 1 is configured to receive the control instructions from the terminal device 2; however, the present invention is not intended to be limited to this configuration. An alternate configuration is also envisaged whereby the operation section 14 is operable by a user to directly input various control instructions to the controller 10 (e.g., powering the garment 1 on and off, setting/initiating the countdown timer, executing the stop or pause function, and the like).

In an embodiment, the control instructions may include soundtrack information having a rhythmic component, and exposure control of the exposure module 20 (e.g., a frequency of exposure, or an amount of exposure) may be performed based on the rhythmic component of the soundtrack information. In a case in which the exposure module 20 comprises a plurality of PDLC film panels 21, control of the PDLC film panels 21 can be selectively performed on a panel-by-panel basis (e.g., by selectively controlling transparency of specific panels), based on the soundtrack information. Further, the system 100 may be configured such that at least one of the garment 1 and the terminal 2 is equipped with a device (e.g., a microphone or the like) so as to be able to pick up environmental (ambient) sounds in the vicinity in which it is being used. In this case, exposure control by the exposure module 20 may be performed based on a change in a rhythmic component of the picked-up environmental sounds (e.g., by controlling an exposure occurrence/frequency of one or more PDLC film panel(s) 21 based on the rhythmic component of the picked-up environmental sounds, in a similar way as described above with respect to the soundtrack information).

Figure 3:
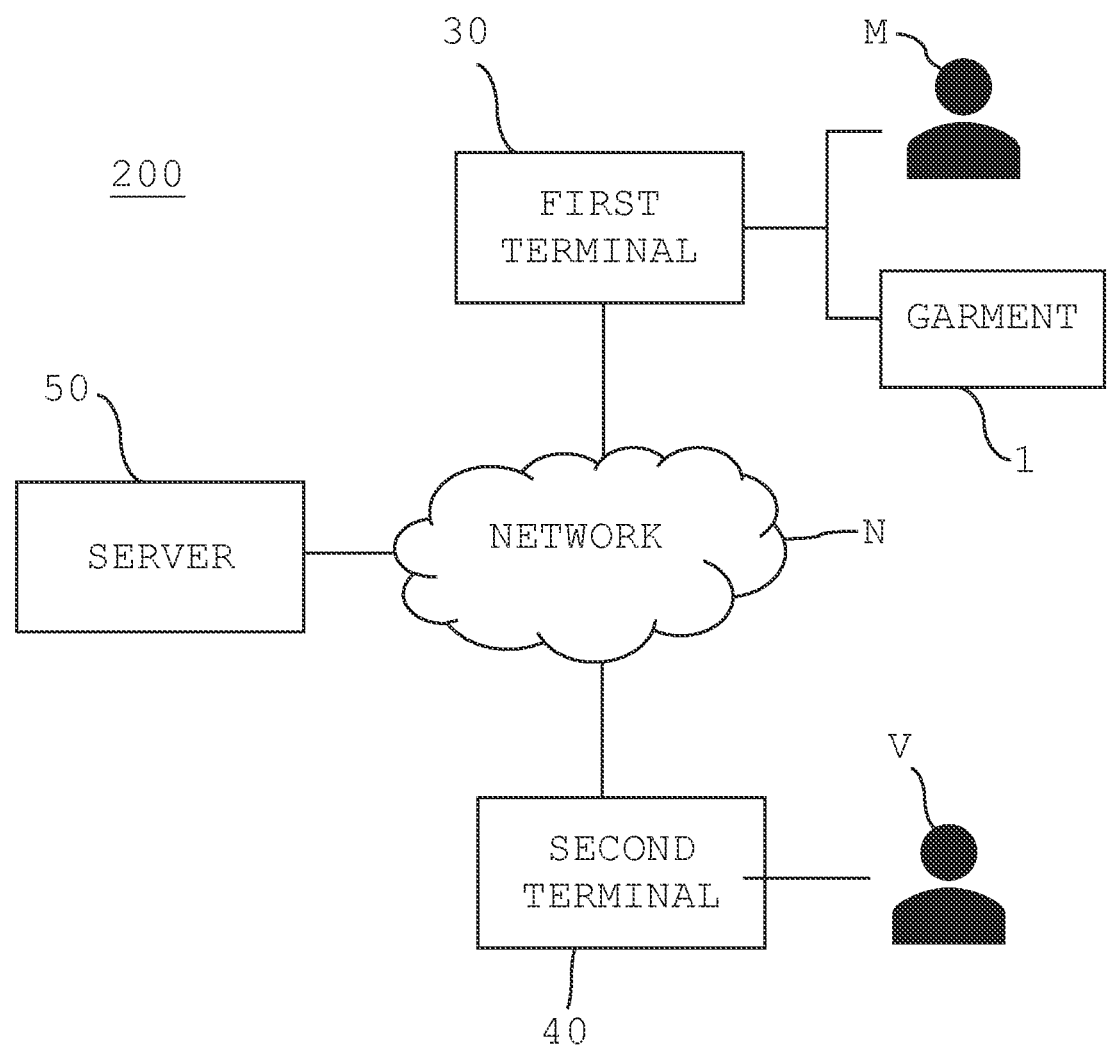
FIG. 3 is a block diagram illustrating an overall configuration of a system according to an embodiment.

FIG. 3 is a block diagram illustrating an exemplary configuration of a system 200 according to an embodiment.

As shown in FIG. 3, the system 200 includes the garment 1, a first terminal 30, a second terminal 40, and a server 50, wherein the first terminal 30, the second terminal 40, and the server 50 are connected via a network N (e.g., the Internet). The garment 1 and the first terminal 30 are operable by a model M (also referred to herein as a performer, host, or streamer) to provide a live video stream via an online platform, and the second terminal 40 is operable by a viewer V. For example, the live video stream may be provided via a website, or via an application installed on one or more of the terminals. The garment 1 is communicably connectable to at least the first terminal 30 via the I/O interface 13. While a single viewer V is shown in FIG. 3 for the sake of clarity, a plurality of second terminals 40 may be provided which are operable by a plurality of viewers V(1) to V(n), such that a live video stream provided/hosted by the model M is viewable by the plurality of viewers V(1) to V(n) simultaneously.

Figure 4:
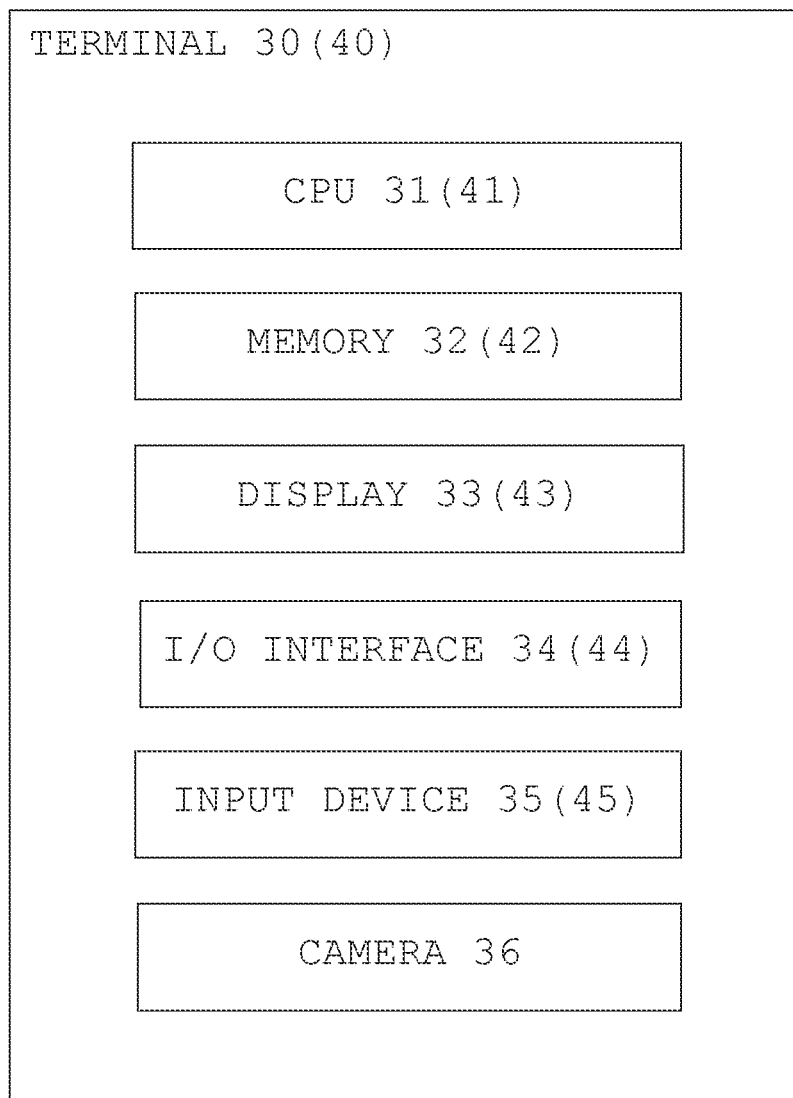
FIG. 4 is a block diagram illustrating a hardware configuration of a user-operable terminal provided in the system.

FIG. 4 is a block diagram illustrating an exemplary configuration of the first terminal 30 (the second terminal 40 is configured in a similar way). As shown in FIG. 4, the first terminal 30 includes a hardware processor (CPU) 31, a memory 32, a display 33, an input/output (I/O) interface 34, and an input device 35 with which a user can input instructions (e.g., a keyboard, mouse, touch screen, microphone, and the like). The first terminal 30 also includes a camera 36 either integrated therein or operably connected thereto. Similarly, the second terminal 40 includes a hardware processor (CPU) 41, a memory 42, a display 43, an input/output (I/O) interface 44, and an input device 45. It is not necessary for the second terminal 40 to include a camera, but one may optionally be provided. For example, each of the first terminal 30 and the second terminal 40 may be configured as one of a computer (e.g., a desktop or laptop computer), a mobile device (e.g., smartphone or tablet), a video game console, and the like.

In the system 200, during a live online video streaming session, the viewer V is able to interact with the model M, and is further able to interact with the garment 1 worn by the model M, either directly or indirectly, via various user interfaces provided thereto, as discussed in further detail below. These interfaces may be provided under control of the server 50 via the network N, or may be provided by one or more software applications stored in and executable by the first and/or second terminals 30, 40.

Figure 5:
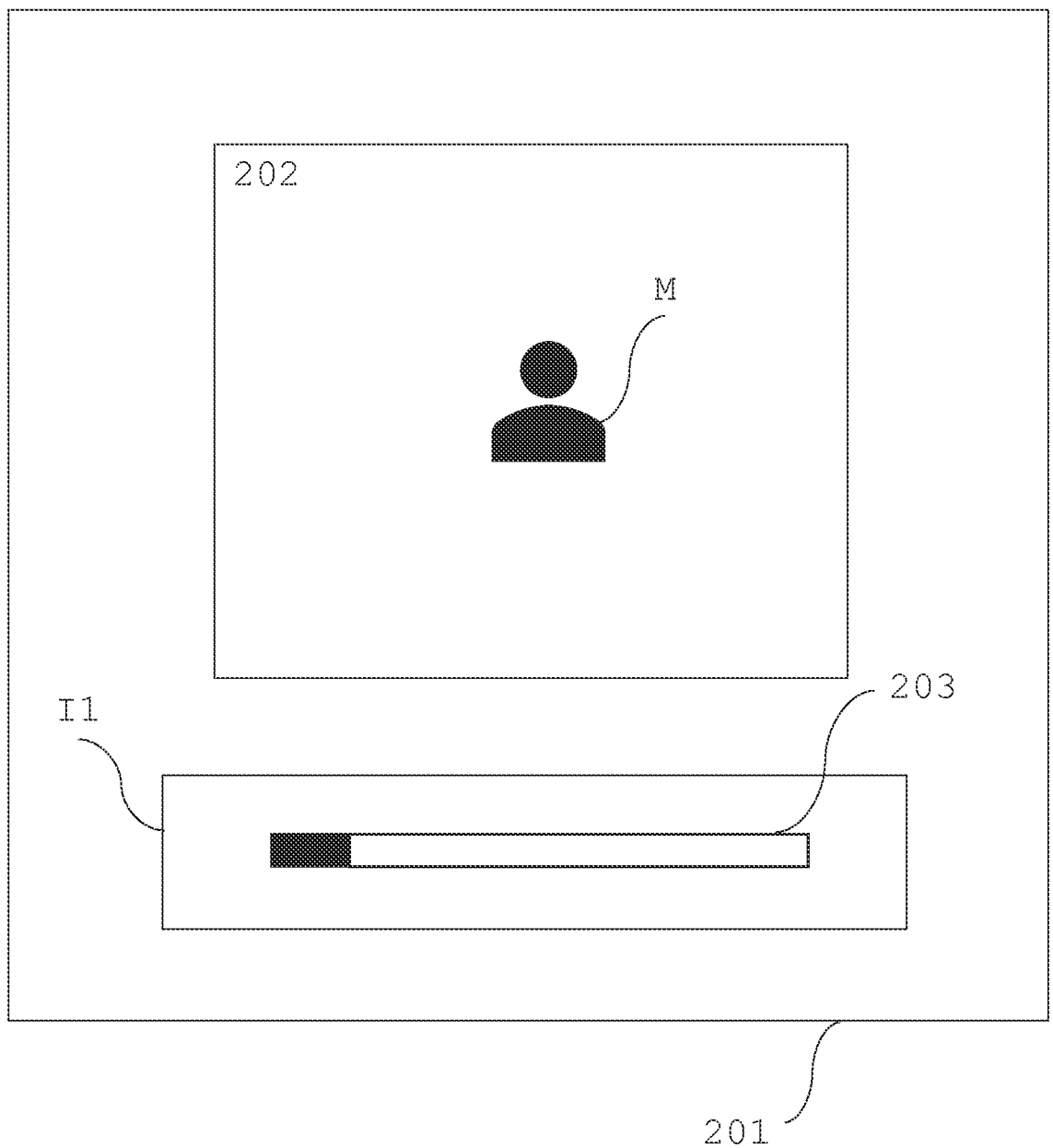
FIG. 5 schematically illustrates an exemplary session screen provided during a live online video streaming session.

FIG. 5 schematically illustrates an exemplary session screen 201 provided to the viewer V at the second terminal 40 (e.g., at the display 43 of the second terminal 40) during a live online video streaming session hosted by the model M. In the example of FIG. 5, the session screen 201 includes at least a streaming portion 202, in which a live video stream provided by and including the model M is displayed, and a first user interface I1, which at least the viewer V can view and interact with during the online video streaming session hosted by the model M (e.g., to input viewer action data, such as contributing tips to the model M). The first interface I1 is presented in the session screen 201 as a component of the live online video streaming session.

Figure 6A:
FIGS. 6A and 6B illustrate exemplary session screens according to an embodiment.
Figure 6B:
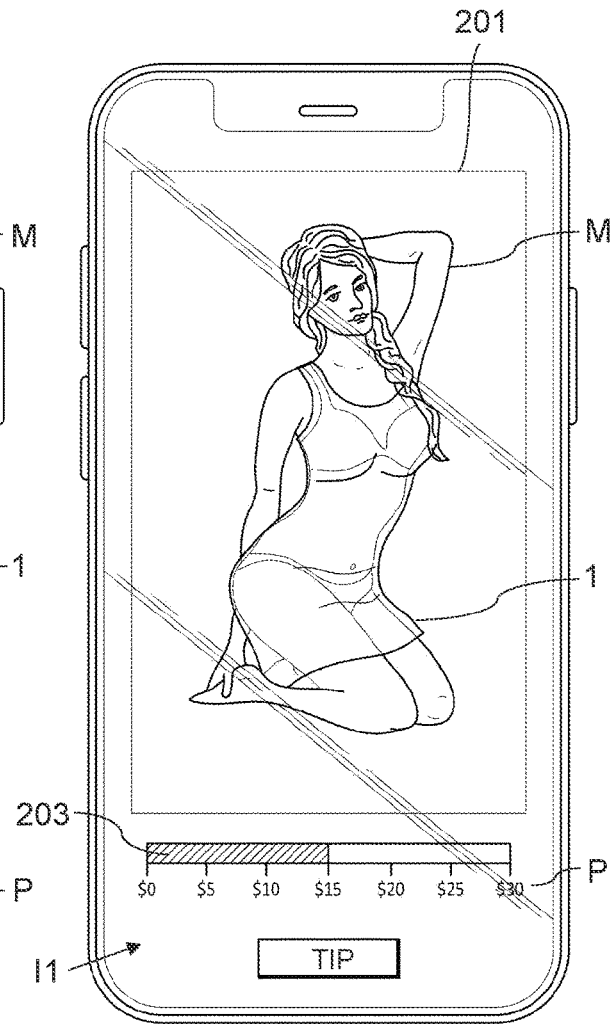

According to an embodiment, the first interface I1 is configured such that the viewer V can contribute ("tip") real and/or virtual currency/gifts to the model M during the live online video streaming session, by way of the first interface I1. An amount of tips contributed, and/or a frequency/rate at which tips are being contributed, can be used to control the exposure state (e.g., transparency) of the garment 1 worn by the model M in real time. In particular, the model M can define, via the first terminal 30, a desire parameter P represented by a numerical value and/or range. The desire parameter P may be informed to the viewer V by display on the first interface I1, to prompt the viewer V to input viewer action data (e.g., tips) to satisfy the desire parameter P and in turn indirectly control an exposure state of the garment 1. In an exemplary session screen 201 shown in FIG. 6A, the first interface I1 is configured to allow the viewer V to input tips, with the desire parameter P being represented as a progress bar. According to this example, as shown in FIG. 6B, the exposure state (e.g., transparency) of the garment 1 worn by the model M is increased as the progress bar fills based on input of tips by the viewer V via the first interface I1. Alternatively, the first interface I1 may include a prompt prompting the viewer V to input viewer action data (e.g., tips), without displaying specific information on how to satisfy the desire parameter P.

As an example, the desire parameter P can represent a predetermined tip value, but can also represent tip frequency. The specific nature of the desire parameter P is not intended to be limited, but can include any material or emotional desire of the model M that can be represented numerically, and that can be satisfied by input action(s) performed by the viewer(s) V. The model M can define several desire parameters P each having its own associated numerical value and/or range. Each desire parameter P is associated with a respective corresponding control timing and/or control type performed by the controller 10 of the exposure module 20 of the garment 1.

Figures 7A, 7B:
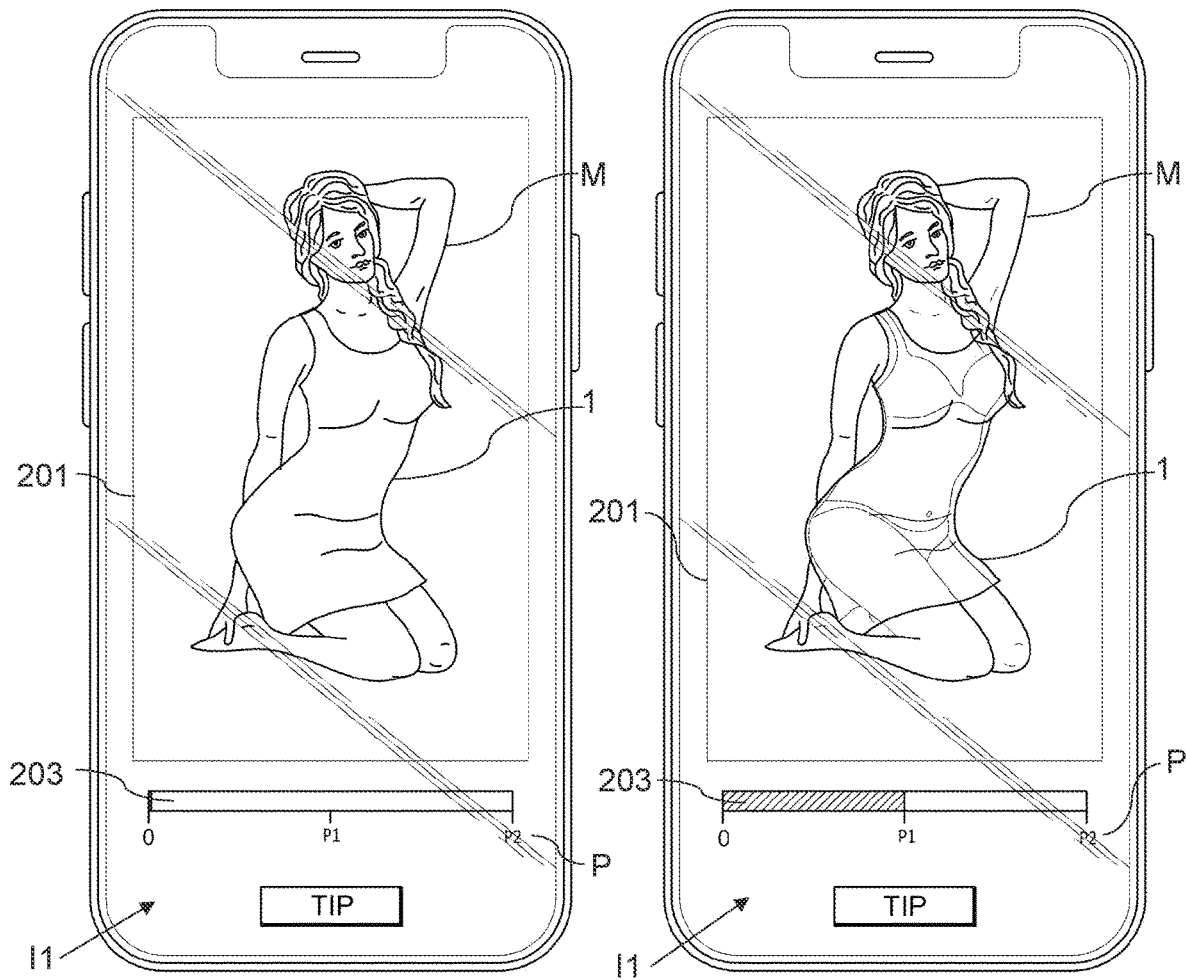
FIGS. 7A and 7B illustrate exemplary session screens according to an embodiment.

In another example, the model M may set a first desire parameter P1 having a relatively lower tip value/frequency threshold (i.e., a lower value or range), and a second desire parameter P2 having a relatively higher tip value/frequency threshold. FIGS. 7A and 7B illustrate exemplary session screens 201 according to this example. Here, the specific number of desire parameters P, and their associated thresholds, are not intended to be limited, and any number and type can be freely set by the model M. FIG. 7A shows an example of the exemplary session screen 201 before the threshold of the first desire parameter P1 is met. In this state, the garment 1 may be controlled to be semi-transparent or to remain opaque until this threshold is met. Then, when the amount/frequency of tips meets or exceeds the threshold of the first desire parameter P1, the garment 1 may be controlled to be more transparent, or entirely transparent. See FIG. 7B. In another example, each desire parameter P may be associated with a respective one of PDLC film panels 21 provided at respective different areas (e.g., intimate areas) of the model M wearing the garment 1, such that amounts/frequencies of tips received within respective defined ranges expose the respective different areas accordingly (as discussed above, when a plurality of PDLC film panels 21 are provided in the garment 1, the level/rate of transparency of each of the PDLC film panels 21 can be individually controlled). These examples are not intended to be limiting, and can be freely combined.

In the examples discussed above, the desire parameters may be configured as tip parameters. The tip parameters may be made visible on the first interface I1, which is provided at least to the second terminal 40, and which may be updated in real time during the live online video streaming session.

In the examples of FIGS. 6A-7B discussed above, the first interface I1 may include an animated progress indicator 203 which represents an amount of progress toward the desire parameter P defined by the model M. The progress indicator 203 may be animated so as "fill" as the desire parameter P is satisfied (e.g., tips are received from viewers V), as shown in FIGS. 6A-7B. Control may be performed such that one or more of the PDLC film panels 21 are made partially or fully transparent in accordance with the current filling status of the progress indicator 203. In an embodiment, each PDLC film panel 21 may gradually be made transparent as the progress indicator 203 fills. In addition, or alternatively, when a plurality of PDLC panels are provided, a greater number of the PDLC film panels 21 may be made transparent as the progress indicator 203 fills.

In a modification, the frequency of tipping may be used as a desire parameter P instead of overall tip amount. In this case, control is performed to make the PDLC film panels 21 gradually transparent through continuous tipping. In the event that the rate/frequency of tipping subsides, the PDLC film panels 21 will return to their original opaque state.

Alternate types of control based on continuous tipping are also envisioned. For example, the total number of PDLC film panels 21 which are made to be transparent, and/or which specific ones of the PDLC film panels 21 are made to be transparent, may be controlled based on whether tipping is continuous or has subsided.

In another modification, the garment 1 may be set to an initially transparent state (e.g., each PDLC film panel 21 thereof is controlled to be at least partially transparent), and a countdown applied to the transparent state of the PDLC film panel(s) 21. The above-described timer function of the controller 10 can be used to realize this feature. In this case, the PDLC film panels 21 which begin in the transparent state will gradually return to their opaque state as the countdown progresses. The progress of the countdown can be delayed or halted by contribution of a threshold amount of tips, or by continuous contribution of tips, in a similar manner as discussed above.

In the above examples, the server 50 executes control to receive input of the desire parameters P from the model M, to receive the viewer input (tips) from the viewer(s) V, and to control display of the first interface I1 on the first and second terminals 30, 40, during a live online video streaming session hosted by the model M; however, the invention is not limited to this configuration. The first and second terminals 30, 40 may be configured to communicate directly, and/or the garment 1 and the second terminals 40 may be configured to communicate directly.

Figure 8:
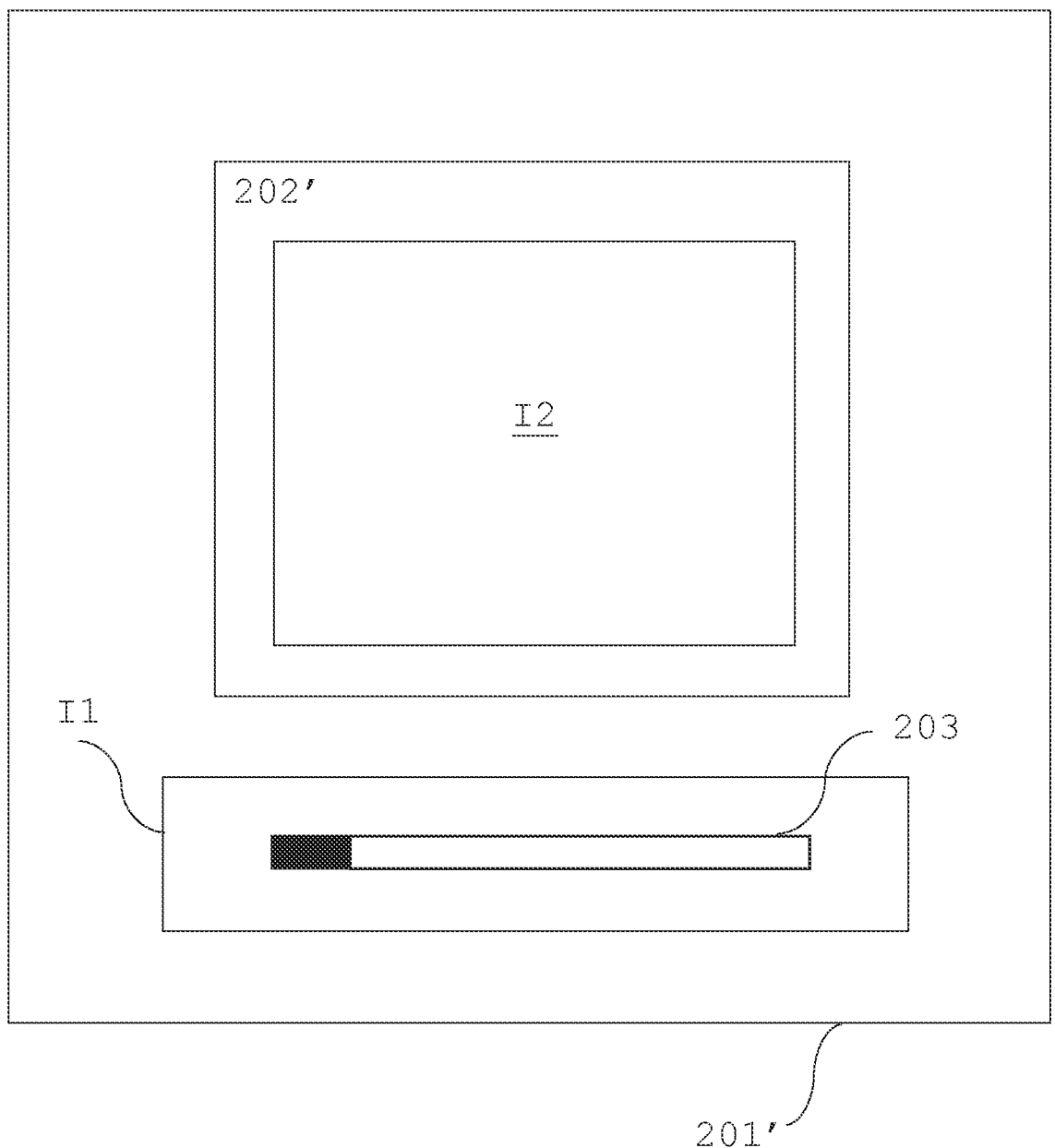
FIG. 8 schematically illustrates a modified session screen provided during a live online video streaming session.

FIG. 8 schematically illustrates an exemplary modified session screen 201' provided to the viewer V at the second terminal 40. As shown in FIG. 8, a second interface I2 may be displayed in the modified session screen 201' as a component of the live online video streaming session, under control of the server 50 and/or the second terminal 40, in a similar manner as the first interface I1 discussed above. The second interface I2 is configured as a graphical user interface containing animation data, and is superimposed over the model M in a streaming portion 202' of the session screen 201'. The second interface I2 includes animation data operable by the viewer V via input of viewer action data with respect to the animation data. As a result, it is only necessary for the second interface I2 to be displayed on the second terminal 40, although it may be displayed on both the first and second terminals 30, 40. While FIG. 8 illustrates both the first and second interfaces I1 and I2 being displayed simultaneously, it is also possible to display only the second interface I2 in the session screen 201'.

In this modification, the second interface I2 is superimposed over the model M to enable various different ways in which the viewer V can interact with the model M, via interaction with the animation data. In one example, the second interface I2 may be configured as an image and/or animation of a piece of clothing superimposed over the model M. In this modification, the animation data is manipulable by the viewer V to selectively reveal portions of the model M based on the nature of the manipulation of the animation data. In particular, the second interface I2 is configured so that the viewer V may interact with the image and/or animation data of the piece of clothing in the second interface I2, whereby data can be obtained regarding the interaction by the viewer V (viewer action data).

Figures 9A, 9B:
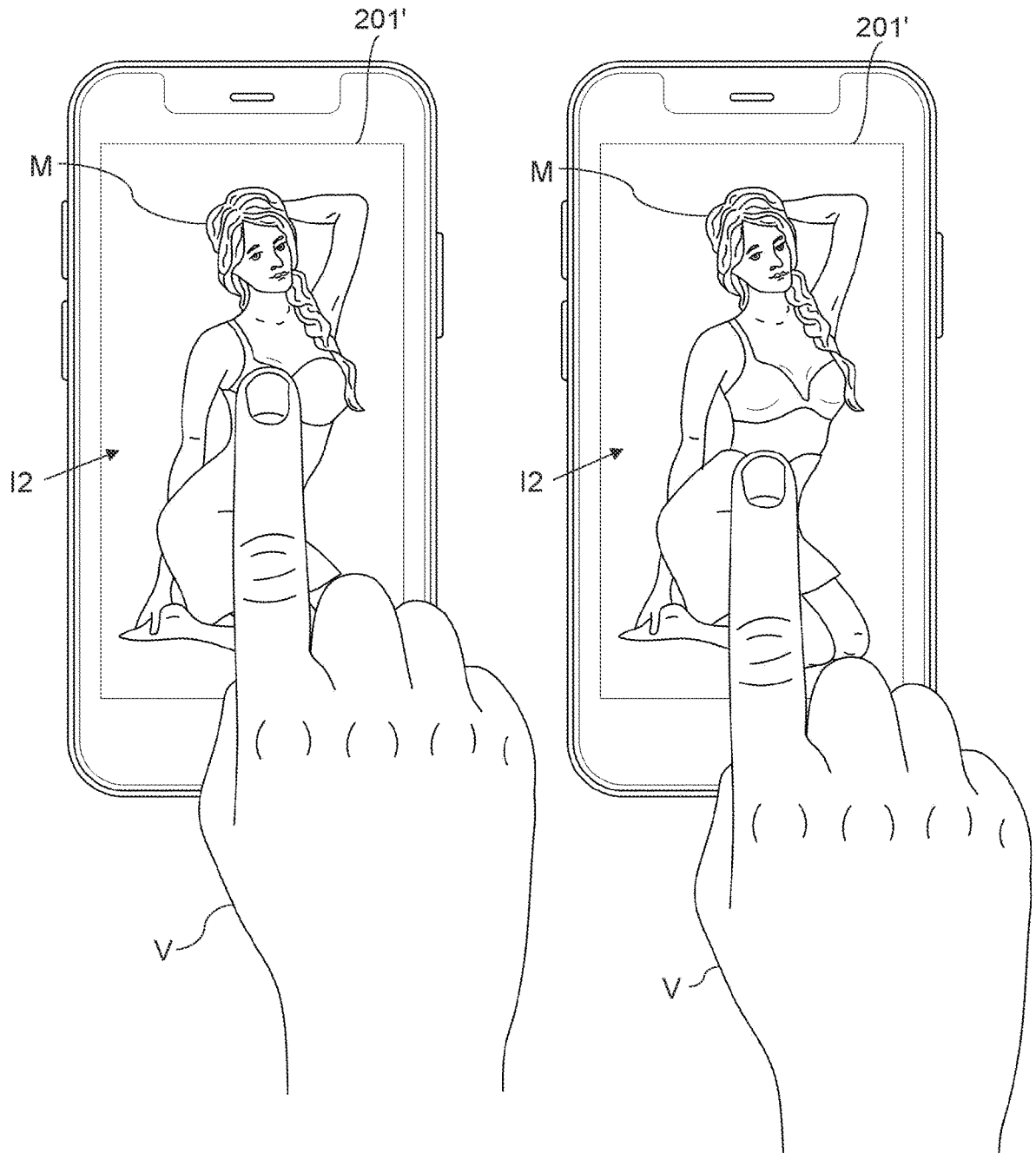
FIGS. 9A and 9B illustrate exemplary session screens according to an embodiment.

For example, in an exemplary session screen 201' illustrated in FIG. 9A, the viewer action data may comprise the viewer V "swiping" at the image and/or animation data in the second interface I2 using the input device 45 of the second terminal 40 (e.g., by using a mouse, by using a finger in a case in which the second terminal 40 is equipped with a touch-screen, as in FIG. 9A, or the like). The server 50 (and/or the second terminal 40) perform animation control of the second interface I2 based on the obtained viewer action data. In this example, in which the viewer action data comprises swiping a portion of the clothing superimposed over the model M in the animation data (as shown in FIG. 9A), the portion of the clothing having been swiped by the viewer will be animated so as to appear to be removed from the model M (as shown in FIG. 9B). In this case, the controller 10 may perform corresponding control to make any PDLC film panels 21 in a vicinity of the portion of the clothing having been animated so as to appear to be removed to become transparent, so as to simulate a situation whereby the viewer V is causing the model M to be exposed by the input of the viewer action data.

In a modification, it is possible to enable the viewer V to achieve exposure of the model M even in the event that the model M is not wearing the garment 1. In this modification, by providing the second interface I2 to be superimposed over the model M when the model M is already in an undressed state, the animation control performed in response to the viewer action data will result in exposure.

Figures 10A, 10B:
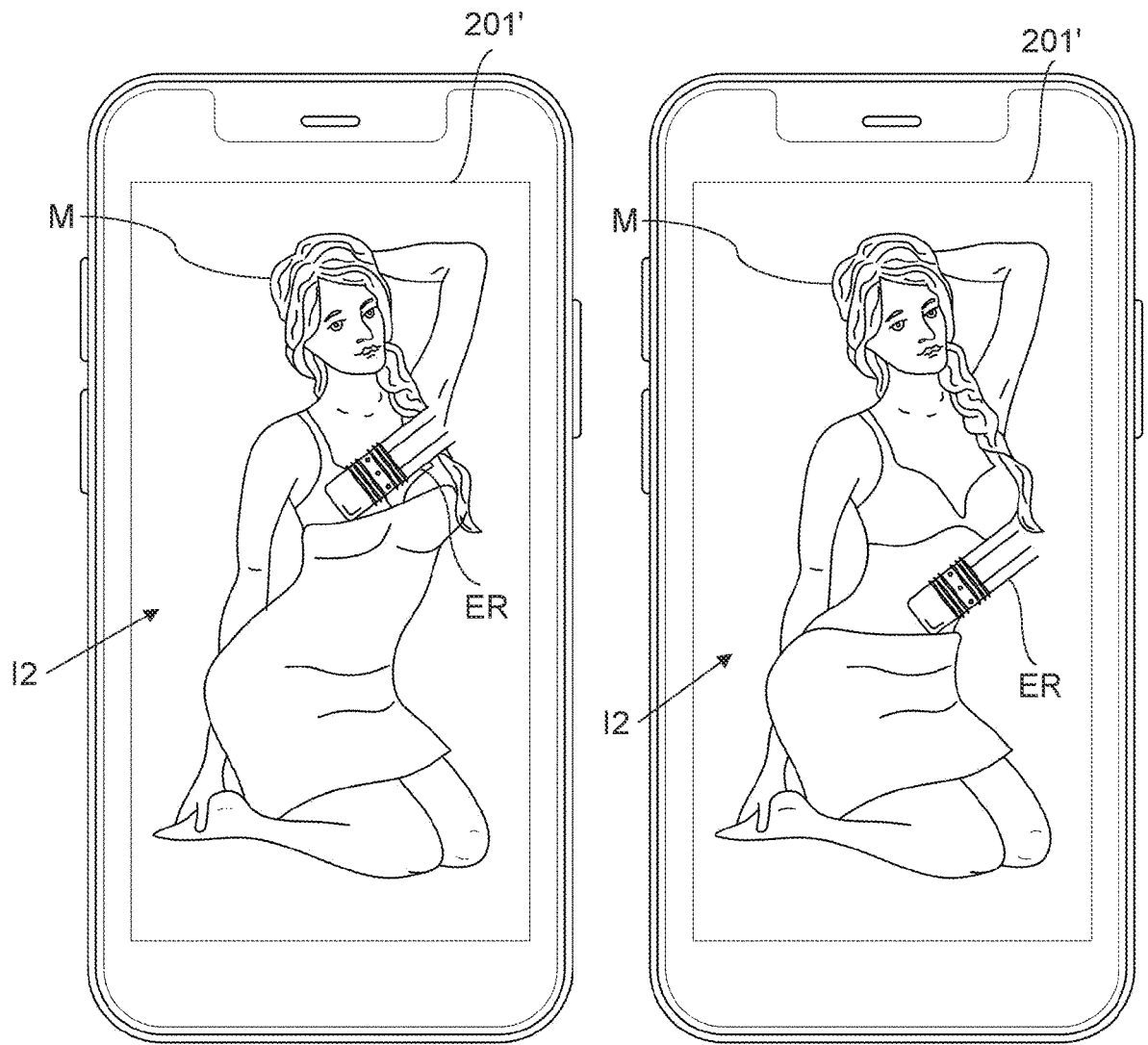
FIGS. 10A and 10B illustrate exemplary session screens according to an embodiment.

In addition to the animation control described above, various other types of animation control can be performed. As another exemplary session screen 201' shown in FIGS. 10A and 10B, the second interface I2 may provide the viewer V with a virtual "eraser" icon ER which the viewer V can drag over the animation data superimposed over the model M to "erase" the portions of the displayed animation data and expose desired portions of the model M.

Figure 11A:
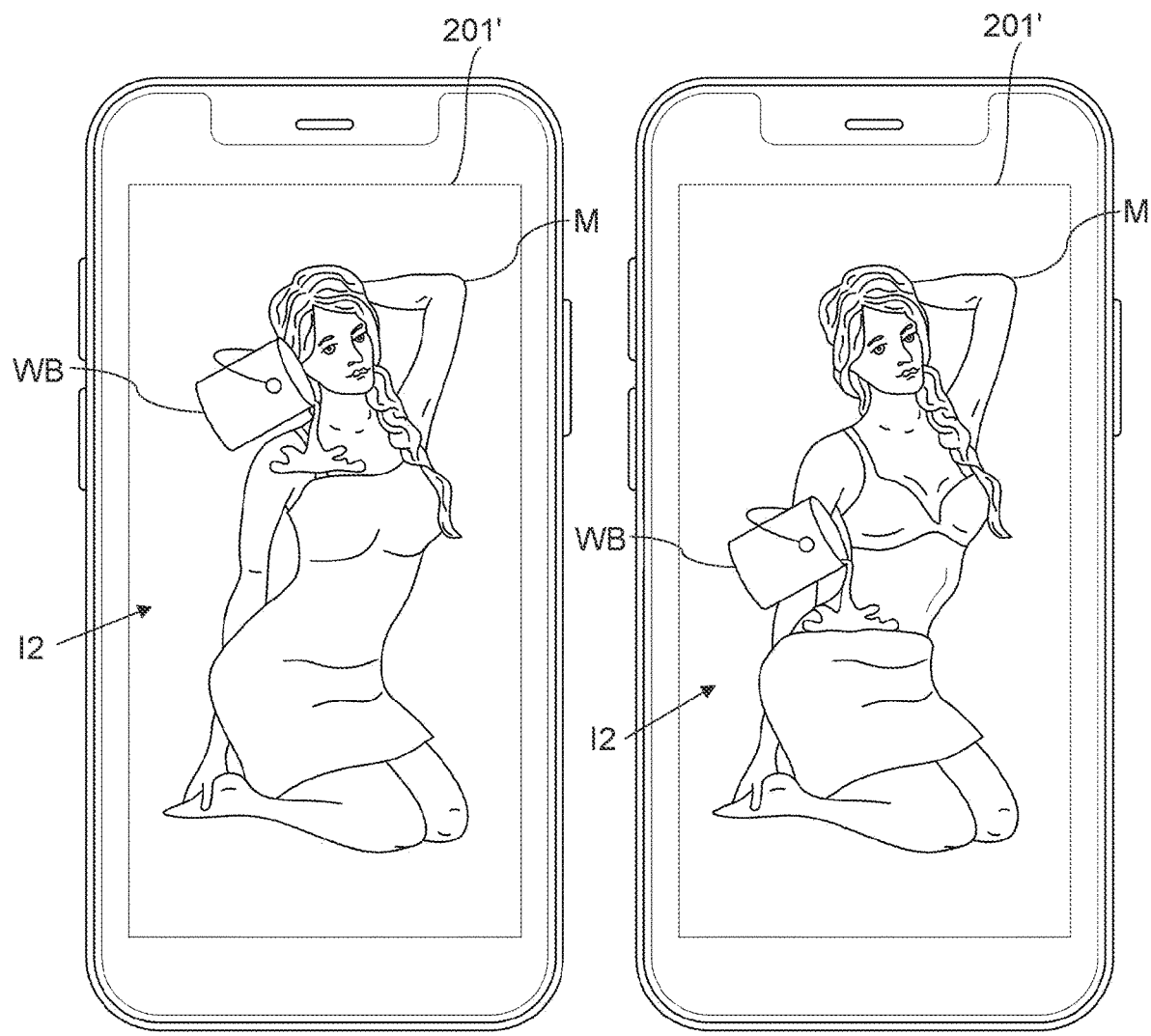

In another exemplary session screen 201' shown in FIGS. 11A and 11B, the second interface I2 may provide the viewer V with a virtual "water bucket" icon WB which the viewer V can drag over the animation data superimposed over the model M within the session screen 201'. In this case, when collision between a position of the water bucket icon WB and the model M is detected, the controller 10 may perform control of the PDLC film panels 21 of the garment 1 in such a way that the PDLC film panels 21 gradually become transparent starting from the position at which the collision was detected (i.e., in a manner simulating water being poured on the model M wearing the garment 1).

Figure 12A:
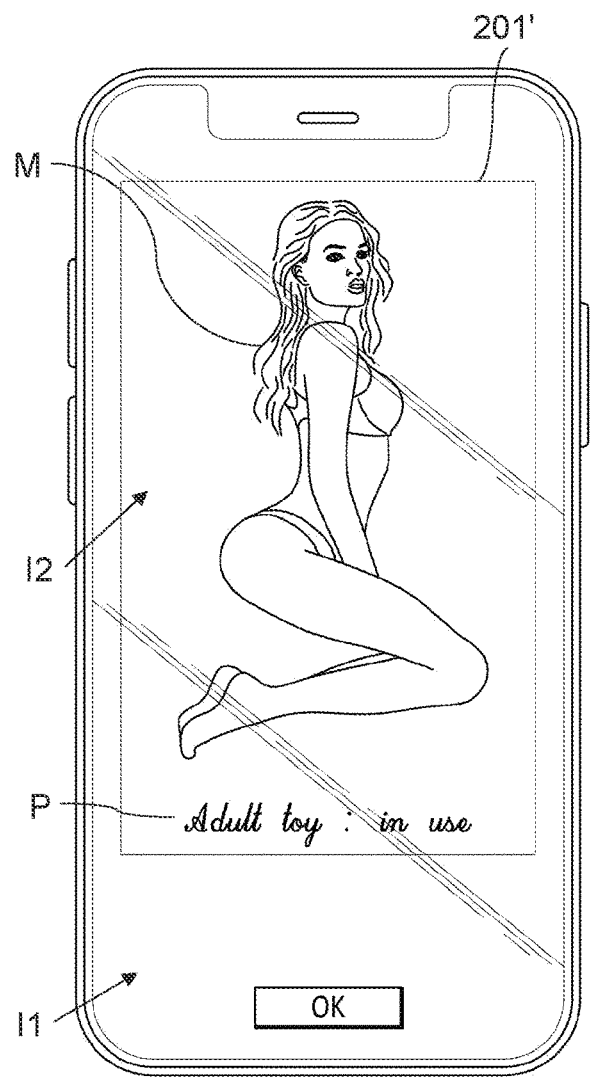
FIGS. 12A and 12B illustrate exemplary session screens according to an embodiment.
Figure 12B:
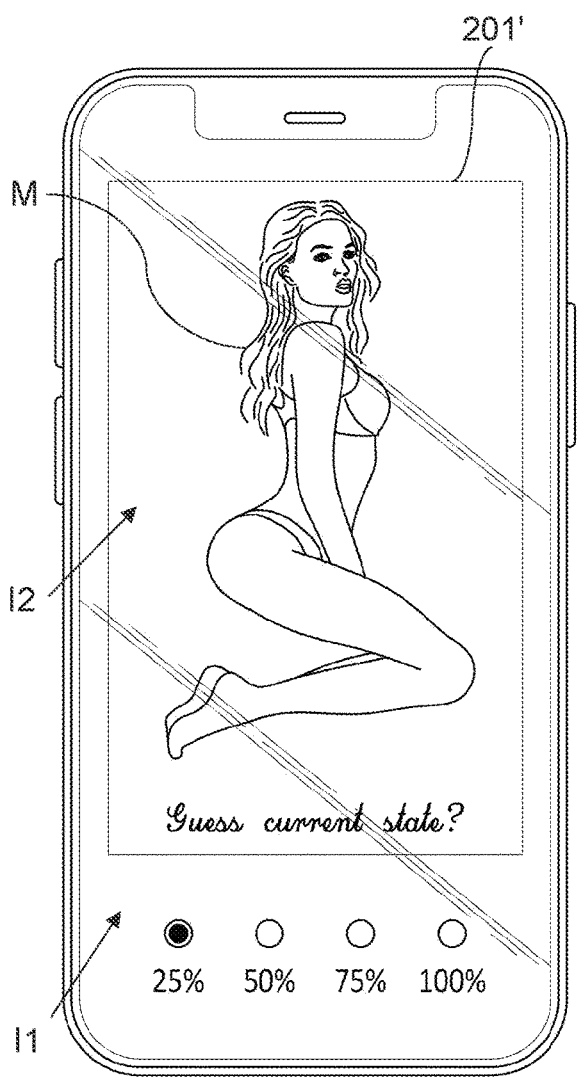

In yet another exemplary session screen 201 shown in FIGS. 12A and 12B, in a case in which the model M uses a wearable and/or insertable adult toy which is configured to output information on its current state (e.g., operation state) during the live online video streaming session, the desire parameter P can include the output information on the current state of the adult toy. FIG. 12A illustrates an example in which the output information includes information indicating that the adult toy is currently in use. Further, FIG. 12B illustrates an example in which the viewer action data may also include input from the viewer V "guessing" the current state of the adult toy, which can be compared to the actual output information, and control can be performed accordingly.

The system 200 may be configured such that display of the second interface I2 is initiated by the viewer V inputting an amount of tips meeting a specific desire parameter P set by the model M for that function. That is, the live online video streaming session is configurable by the model M such that control of the garment 1 via the viewer input data input by the viewer V is not enabled until a specific desire parameter P has been met (e.g., a specific amount and/or frequency of tips has been input, along similar lines as discussed above with respect to FIGS. 6A-7B).

In the system 200 described above, the viewer V can have a more active role in exposure of the model M, via interaction with the first and/or second interfaces I1, I2, during a live online video streaming session, allowing for a new type of mutual enjoyment for the model M and viewer V.

As discussed above, in the system 200, the first terminal 30 operated by the model M includes a camera 36. Image data output by the camera 36 may be used to prevent control of the exposure module 20 (i.e., to maintain the PDLC film panels 21 in an opaque state), and/or to prevent display of the second interface I2, when it is detected that someone other than the model M is currently in the field of view of the camera 36. This detection can be performed based on an image output by the camera 36, output of a microphone (not illustrated), or the like.

Further, in the system 200, the controller 10 may be configured to control the camera 36 to capture an image of the model M at a timing at which at least a portion of the model's anatomy is exposed in response to viewer input data inputted by a certain viewer V (e.g., as shown in any of FIGS. 6B, 7B, 9B, 10B, and 11B), and to transmit the captured image to the certain viewer V from which the viewer input data originated.

In a similar way, the controller 10 may be configured such that, when the progress indicator 203 is filled and the model M accordingly placed in an exposed state, the camera 36 is controlled to capture an image of the model M placed in the exposed state. Then, the captured image of the model M may be sent to the last viewer V who contributed to the filling of the progress indicator 203, or may be sent to all viewers V currently watching and/or participating in the live online video streaming session.

Figure 13:
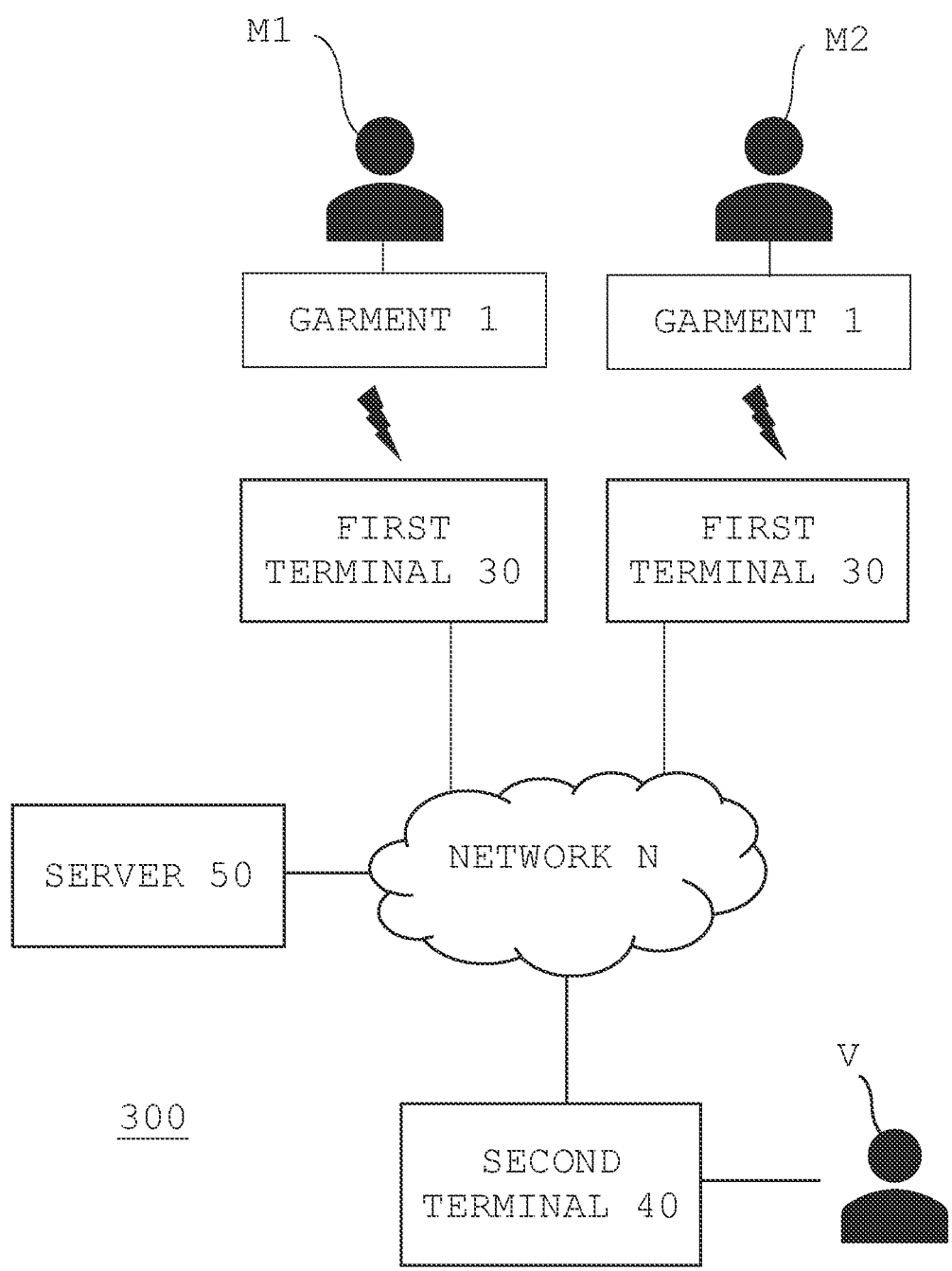
FIG. 13 is a block diagram illustrating an overall configuration of a system according to an embodiment.

FIG. 13 illustrates an exemplary configuration of a system 300. The system 300 is configured in a manner similar to the system 200, but includes first and second models M1 and M2 each wearing a garment 1, and operating respective first terminals 30.

Figure 14:
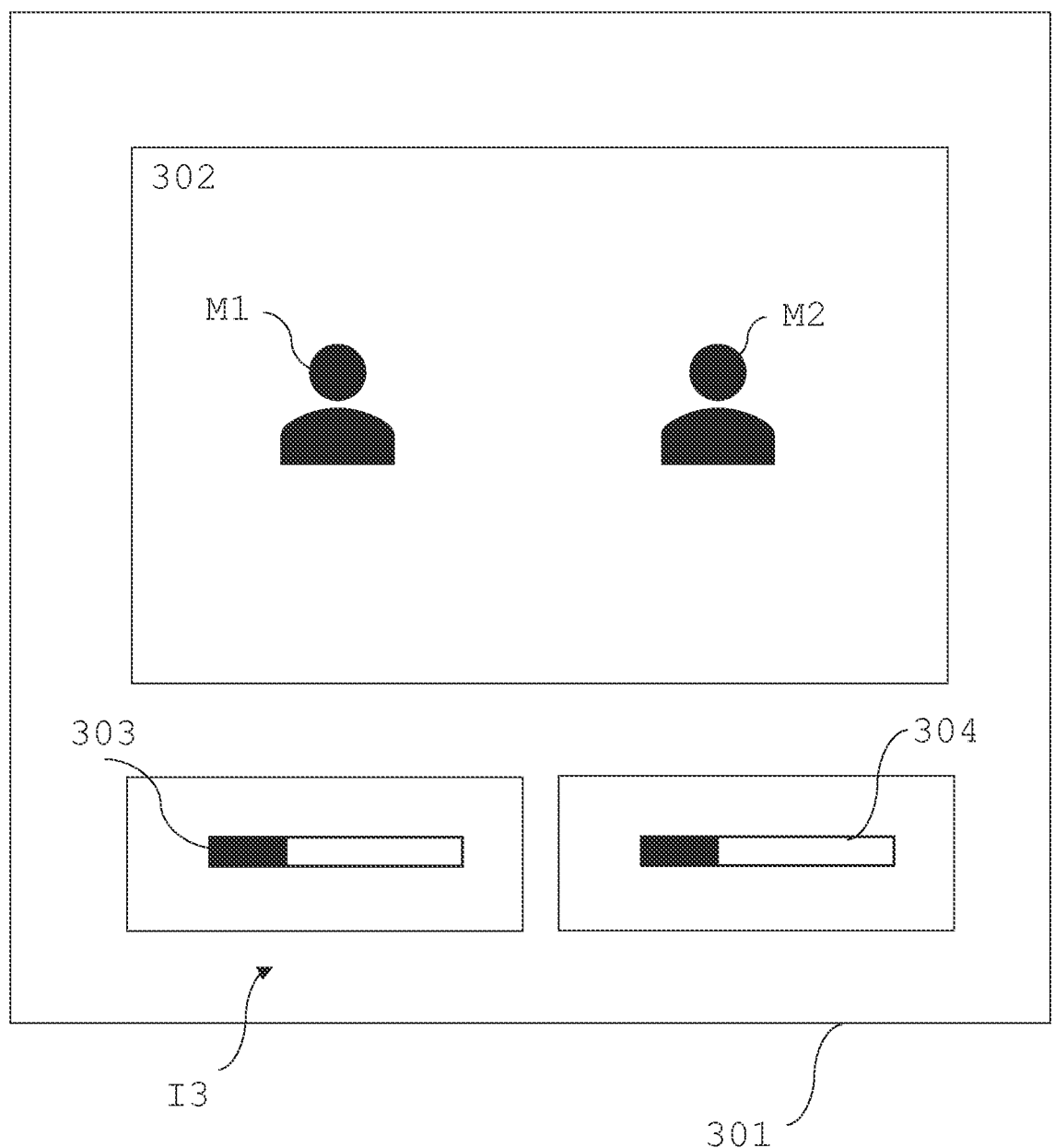
FIG. 14 schematically illustrates an exemplary session screen provided during a live online video streaming session.

FIG. 14 schematically illustrates an exemplary session screen 301 provided to the viewer V at the second terminal 40 (e.g., at the display 43 of the second terminal 40) during a live online video streaming session hosted by the first and second models M1, M2, in the system 300. In the example of FIG. 14, the session screen 301 includes at least a streaming portion 302, in which live video streams provided by and including the models M1, M2 are displayed in association with each other, and a third user interface I3, with which the viewer V can interact during the online video streaming session hosted by the models M1, M2 (e.g., to input viewer data, such as contributing tips to the models M1, M2). The third interface I3 is presented in the session screen 301 as a component of the online video streaming session.

Figure 15:
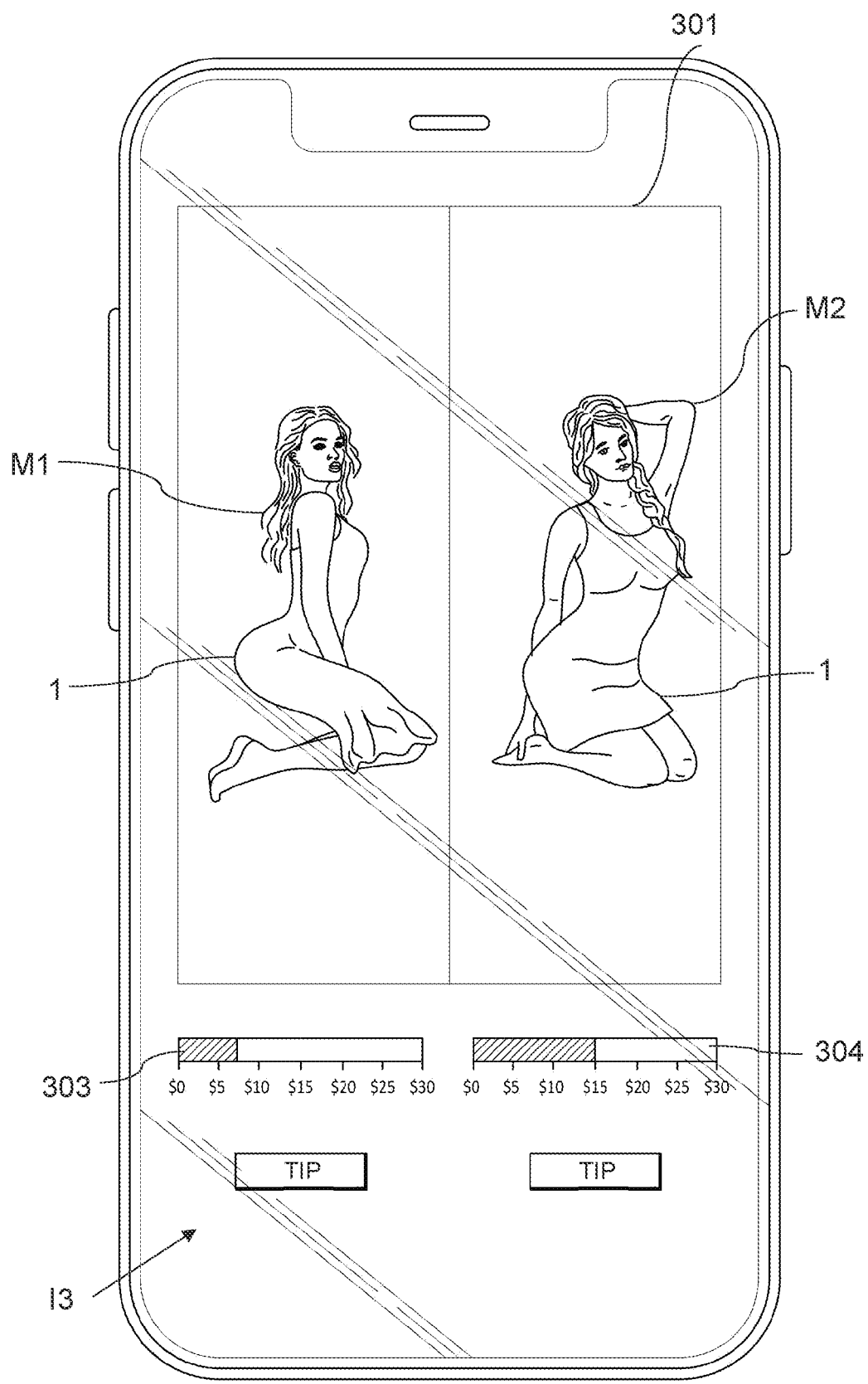
FIG. 15 illustrates an exemplary session screen according to an embodiment.
Figure 16:
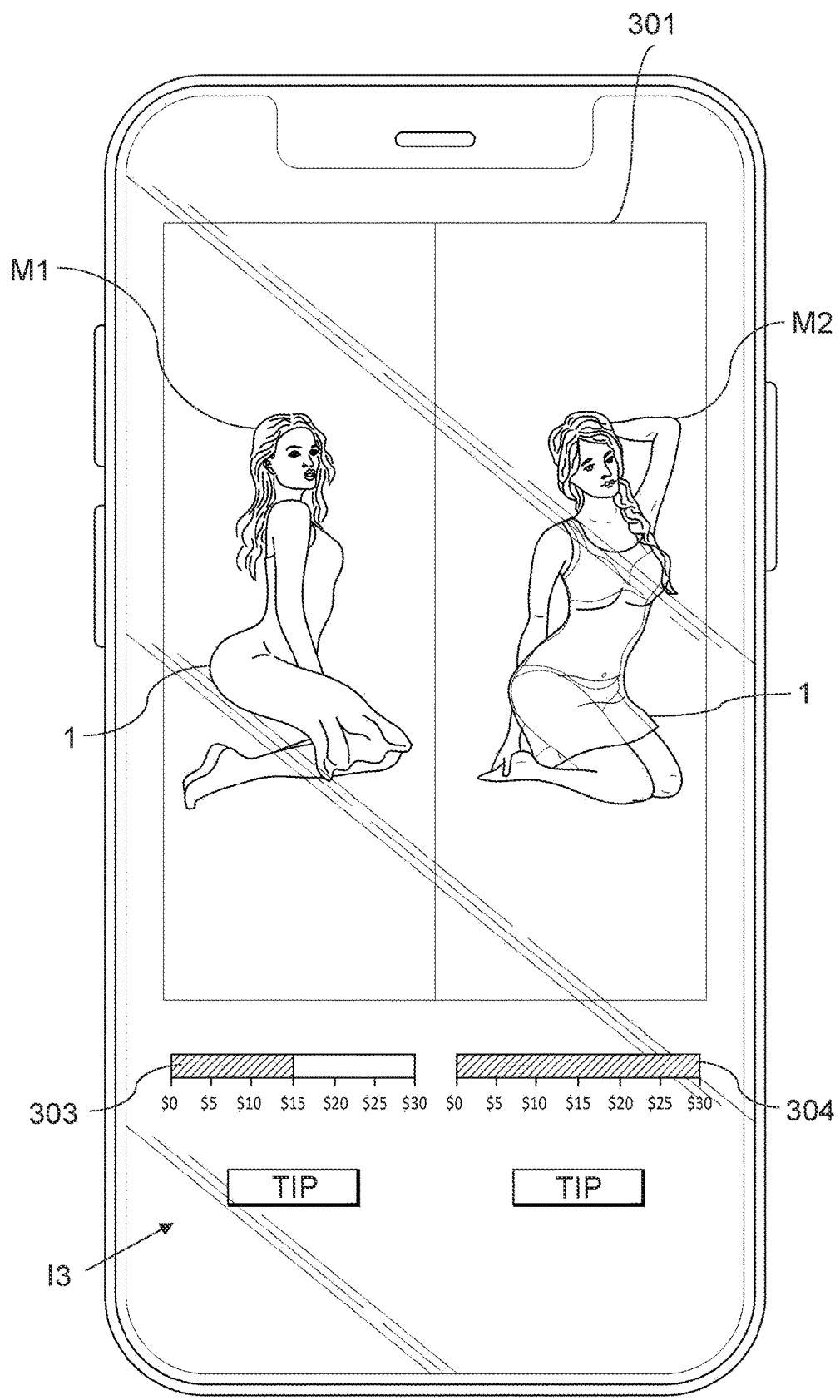
FIG. 16 illustrates an exemplary session screen according to an embodiment.

In a similar way as described above with respect to the first interface I1, the third interface I3 may include a first animated progress indicator 303 for the first model M1, and a second animated process indicator 304 for the second model M2. FIG. 15 shows an exemplary session screen 301. In an embodiment, each viewer V can contribute a tip to only one of the first and second models M1, M2. As tips are contributed to the first and second models M1, M2, their respective corresponding progress indicator 303, 304 may be animated so as to "fill" in real time until one of the progress indicators 303, 304 is completely filled. Then, the controller 10, in cooperation with the server 50, performs exposure control when it is detected that one of the progress indicators 303, 304 is completely filled. For example, as shown in FIG. 16, exposure control (e.g., controlling transparency of the PDLC film panels 21 of the garment 1, as described above) may be performed with respect to the garment 1 worn by the model whose progress indicator has filled up first, and/or with respect to the model whose progress indicator is not yet completely filled. For example, the garment 1 may be controlled such that the PDLC film panels 21 thereof are fully transparent/exposed for a predetermined amount of time, or direct exposure control of the garment 1 may be granted to a viewer (e.g., the viewer V who contributed the final tip which caused the progress indicator to be completely filled). In a modification, any tips contributed to the model whose progress indicator is not yet completely filled may instead be awarded to the model whose progress indicator is completely filled.

Figure 17:
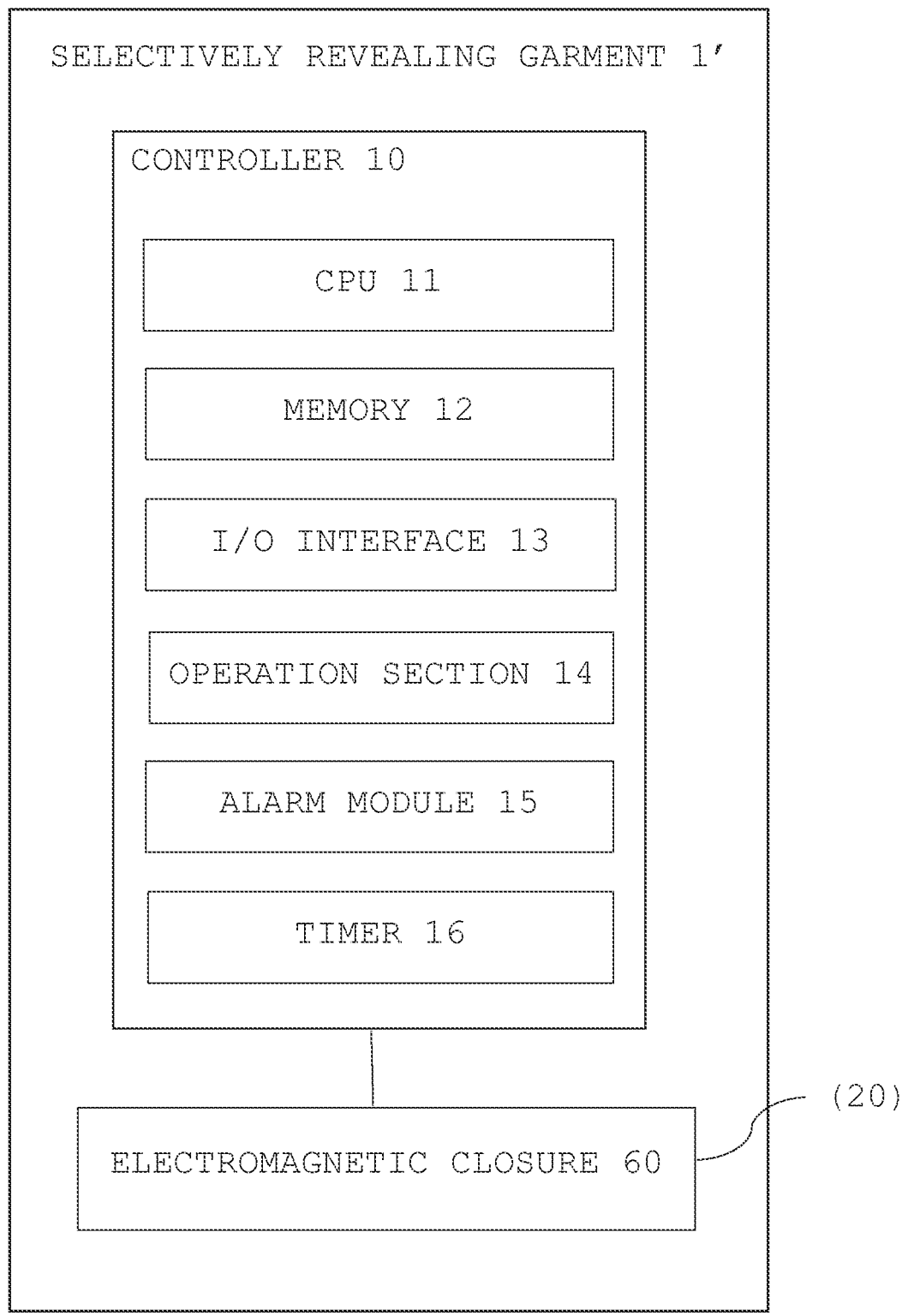
FIG. 17 schematically illustrates a modified configuration of the selectively revealing garment.

As discussed above, at least a portion of the garment 1 is formed of PDLC film panel(s) 21 to achieve exposure; however, the present invention is not limited to this configuration. FIG. 17 shows an alternate configuration of a garment 1' in which exposure is achieved by control of an electromagnetic closure 60. For example, the electromagnetic closure 60 can be controlled by the model M and/or a viewer V either directly or indirectly, instead of (or in addition to) controlling transparency of PDLC film panels 21. The specific location at which the electromagnetic closure 60 is provided in the garment 1' is not intended to be limited, and those of ordinary skill in the art will appreciate that the garment 1' may take any shape so long as it is possible to achieve selective exposure of a model M wearing the garment 1' by control of the electromagnetic closure 60 thereof.

As used hereinabove, ordinal terms such as "first," "second," etc., are not necessarily intended to convey a certain order, but to differentiate between like elements.

The present invention as described above achieves an improvement over conventional technology by extending hardware capabilities of a selectively revealing garment 1 to enable different types of exhibitionist activities, both in real and virtual spaces, that may otherwise not be possible. In particular, the present invention enables people who are interested in experimenting with exhibitionism to do so in a secure way. Further, the present invention enables one or more models M wearing the garment 1 to interact with viewers V of an online video streaming session hosted by the model(s) M, and enables a viewer V to directly or indirectly interact with and/or control transparency of the garment 1 worn by the model(s) M in various ways, thereby realizing new ways of interaction and improved mutual enjoyment between the model(s) M and the viewer V during the course of the online video streaming session.

It will be apparent to those skilled in the art that various modifications and variations can be made to the system and method described herein. Additional embodiments will be apparent to those skilled in the art from consideration and/or practice of the instant disclosure. It is intended that the specification and examples provided herein be considered as exemplary only, with the true scope of the invention being described by the appended claims.

What is claimed is:

1. A system for broadcasting content, the system comprising:
   a memory device having stored thereon a set of instructions; and
   a hardware processor which, under control of said set of instructions, is configured to:
      establish a communication between a first terminal device and at least one second terminal device via a network, the network providing a live streaming video via a website accessible by each of the at least one second terminal device and the first terminal device, the first terminal device being operated by a host user hosting the live streaming video, and each of the at least one second terminal device being operated by a user viewing the live streaming video;
      communicably connect a selectively revealing garment worn by the host user with the at least one second terminal device, the selectively revealing garment including a controller and a selectively revealing portion, the selectively revealing garment being communicably connected with the first terminal device, and the selectively revealing portion being configured to selectively reveal at least a portion of a body of the host user wearing the selectively revealing garment under control of the controller;
      in response to receiving input data input by a user of one of the at least one second terminal device, generate control command data based on the input data;
      transmit the generated control command data to the controller; and
      capture and present, by the first terminal device to the one of the at least one second terminal device via the live streaming video, an exposure procedure of controlling the selectively revealing portion to selectively reveal at least a portion of the body of the host user wearing the selectively revealing garment, and
   wherein the controller is configured to control the selectively revealing portion to perform the exposure procedure based on the control command data transmitted thereto.

2. The system according to claim 1, wherein the selectively revealing portion comprises at least one selectively transparent panel, the selectively transparent panel comprising a polymer-dispersed liquid crystal (PDLC) film.

3. The system according to claim 2, wherein a level of transparency of the at least one selectively transparent panel is controllable based on a voltage applied thereto.

4. The system according to claim 3, wherein the controller is configured to control a voltage output to the at least one selectively transparent panel to control the level of transparency thereof, based on the received control command data.

5. The system according to claim 4, wherein the controller is configured to independently control each of the at least one selectively transparent panel, based on the received control command data.

6. The system according to claim 1, further comprising a wireless communication section which communicates wirelessly via short range wireless communication,
   wherein the control instructions are received via the wireless communication section.

7. The system according to claim 1, wherein:
   the selectively revealing portion comprises an electromagnetic closure selectively fastening at least two portions of the selectively revealing garment together, and
   the controlling comprises controlling the electromagnetic closure so as to unfasten the at least two portions of the selectively revealing garment, based on the received control command data.

8. A method for broadcasting content, the method comprising:
   communicatively connecting a selectively revealing garment worn by a host user operating a first terminal device with at least one second terminal device, the selectively revealing garment including a controller and a selectively revealing portion, and the selectively revealing portion being configured to selectively reveal at least a portion of a body of the host user wearing the selectively revealing garment under control of the controller;
   providing, by the first terminal device, a live streaming video hosted by the host user via a network, the network being accessible by each of the at least one second terminal device and the first terminal device, and each of the at least one second terminal device being operated by a user viewing the live streaming video;
   in response to receiving input data input by a user of one of the at least one second terminal device, generating control command data based on the input data; and
   transmitting the generated control command data to the controller,
   wherein the controller is configured to control the selectively revealing portion based on the control command data transmitted thereto.

9. The method according to claim 8, wherein:
   the first terminal device is communicably coupled to the selectively revealing garment, and
   the input data comprises data input to the one of the at least one second terminal device by the user of the one of the at least one second terminal device.

10. The method according to claim 8, further comprising:
    receiving input of a first parameter input by the host user, the first parameter indicating at least one of a numerical value and a numerical range,
    wherein the generating the control command data based on the input data and the transmitting the generated control command data to the controller are performed in response to determining that the input data falls within the at least one of the numerical value and the numerical range of the first parameter.

11. The method according to claim 10, wherein:
    the first parameter comprises plural first parameters of different types,
    each different type of first parameter corresponds to a respective one of a plurality of numerical ranges, and
    each of the plurality of numerical ranges corresponds to a respective different type of control command data.

12. The method according to claim 10, further comprising:
controlling display of a first interface on at least one of the first terminal device and the at least one second terminal device, and
the first interface comprises a progress indicator having a length corresponding to the at least one of the numerical value and the numerical range of the first parameter.

13. The method according to claim 12, wherein:
the selectively revealing portion comprises at least one selectively transparent panel,
the selectively transparent panel comprises a polymer-dispersed liquid crystal (PDLC) film, and
the control command data is generated based on a completion percentage of the progress indicator, the control command data comprising data for controlling transparency of the at least one selectively transparent panel according to the completion percentage.

14. The method according to claim 13, further comprising:
controlling display of a second interface on at least the at least one second terminal device, the second interface comprising interactive animation data with which a user of the at least one second terminal device can interact,
wherein the control command data is generated based on user action data obtained by the user of the at least one second terminal device interacting with the interactive animation data, the control command data comprising data for controlling transparency of the at least one selectively transparent panel according to the obtained user action data.

15. The method according to claim 8, wherein:
a camera is operably coupled to the first terminal device, and
the controller is configured to not perform control of the selectively revealing portion in a case in which a user other than the host user is detected within a field of view of the camera.

16. The method according to claim 15, further comprising controlling, by the controller, the camera to capture an image of the host user in a case in which at least a portion of the body of the host user is selectively revealed via the exposure module.

17. A non-transitory computer-readable storage medium having a program stored thereon, the program being executable to control a hardware processor to execute processes comprising:
communicatively connecting a selectively revealing garment worn by a host user operating a first terminal device with at least one second terminal device, the selectively revealing garment including a controller and a selectively revealing portion, and the selectively revealing portion being configured to selectively reveal at least a portion of a body of the host user wearing the selectively revealing garment under control of the controller;
providing, by the first terminal device, a live streaming video hosted by the host user via a network, the network being accessible by each of the at least one second terminal device and the first terminal device, and each of the at least one second terminal device being operated by a user viewing the live streaming video;
in response to receiving input data input by a user of one of the at least one second terminal device, generating control command data based on the input data; and
transmitting the generated control command data to the controller,
wherein the controller is configured to control the selectively revealing portion based on the control command data transmitted thereto.

* * * * *